United States Patent Office 3,514,395
Patented May 26, 1970

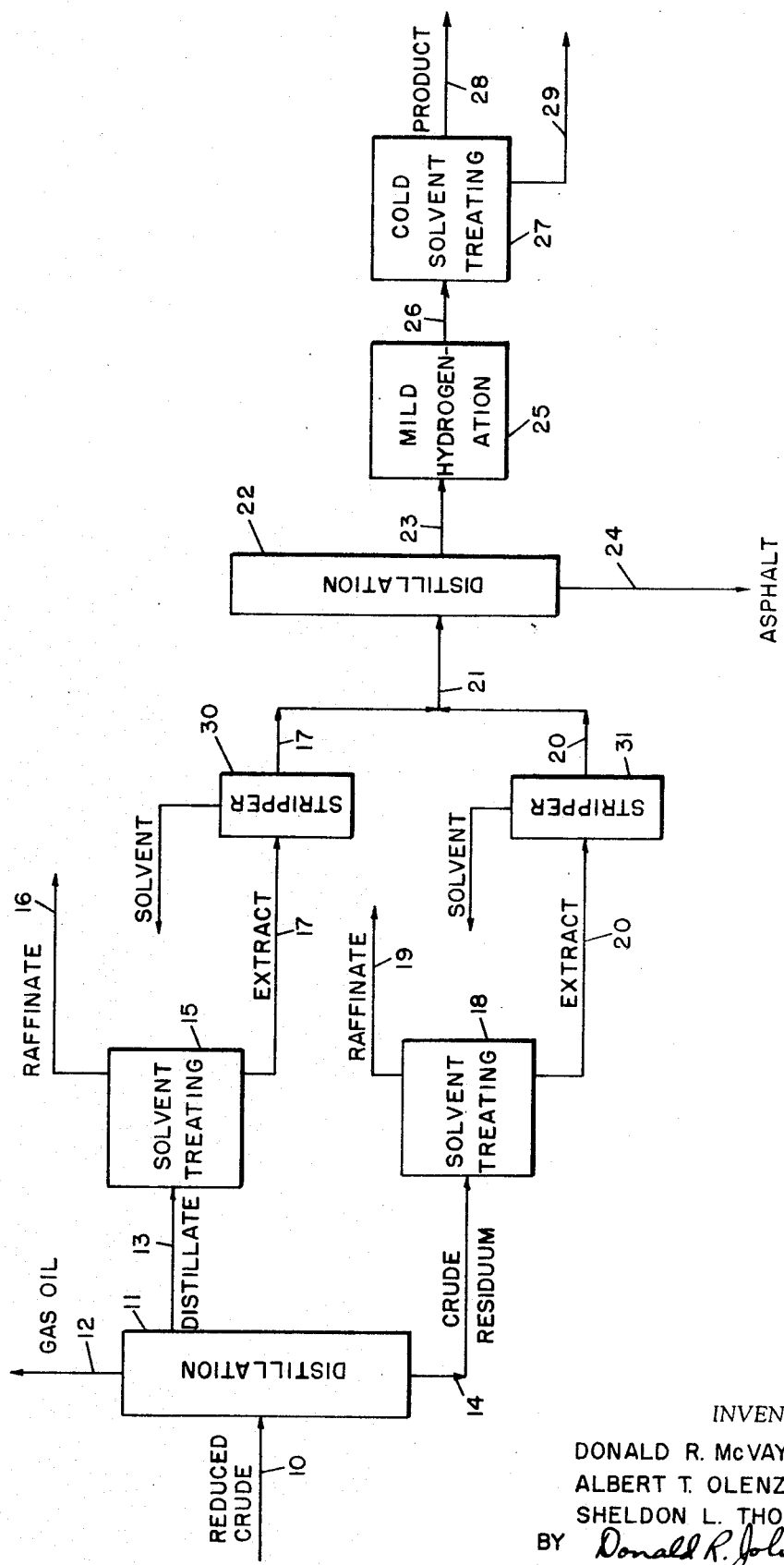

3,514,395
PROCESS FOR PRODUCING A HIGH AROMATIC, LOW COLOR, UV STABLE PROCESS OIL
Donald R. McVay, Wilmington, Del., and Albert T. Olenzak, Media, and Sheldon L. Thompson, Glen Mills, Pa., assignors to Sun Oil Company, Philadelphia, Pa., a corporation of New Jersey
Filed May 29, 1968, Ser. No. 733,095
Int. Cl. C10g 29/00, 23/02
U.S. Cl. 208—96    14 Claims

ABSTRACT OF THE DISCLOSURE

A process for forming low color, ultraviolet stable, high aromatic oils wherein a high aromatic base stock is subjected first to a mild hydrogenation process and then to a cold solvent treatment, and the products obtained thereby.

---

This invention relates to high aromatic oils and, more particularly, to oils which have low color characteristics and good ultraviolet stability.

High aromatic industrial oils have found wide use in industry today as extenders and process aids for rubbers and resins employed in the manufacture of rubber boots, tires, and battery cases. The inclusion of high aromatic oils in these compounds tend to improve their physical properties and reduce manufacturing costs, while at the same time enabling the rubber to be compounded easier.

Conventionally, high aromatic process oils are produced by first segregating crude oil on the basis of desirable fractions boiling in the lubricating oil range. The reduced crude or bottoms from this distillation is then fractionated, producing a crude residuum which is subsequently solvent-treated. The extract of this solvent treatment, which is highly aromatic, is utilized as the base stock for process oil.

Difficulties have arisen in enlarging the application of these oils, however, due to their poor color and their instability to ultraviolet (UV) light. That is, the oils not only have a high undesirable color originally, but the color becomes darker in the presence of UV radiation. Although the exact cause of the color and stability deficiencies are not fully known, it is believed that the presence of polynuclear aromatics, heterocyclic compounds containing nitrogen, oxygen, or sulfur, or olefins in the extract are the probable molecule types which are unstable.

It is, therefore, the object of this invention to provide an improved, high aromatic process oil.

Specifically, it is the object of this invention to provide a low, stable color, high aromatic process oil.

Other objects of this invention will become apparent as the invention is more fully disclosed.

Briefly, and in accordance with the objects of this invention, we have found that a low, stable color process oil can be obtained by submitting a high aromatic extract first to a mild hydrogenation process and subsequently to a solvent treatment. The term "mild hydrogenation" as herein applied refers to the saturation of olefinic or aromatic bonds with no significant reduction in molecular weight by cracking. Hereinafter, hydrogenation is to be distinguished from hydrocracking or severe hydrogenation, such as disclosed in U.S. Pat. No. 3,256,175, which refers to the reduction of molecular weight by cracking in a hydrogen atmosphere. Although hydrocracking or severe hydrogenation tend to destroy certain troublesome multiringed configurations, numerous color body precursors remain following such processes; and the precursors are able to form detrimental color bodies after said reactions.

Conditions of the hydrogenation which must be met to obtain the desired color and stability effect are as follows: temperature, 400° to 675° F.; pressure, 200 to 1500 p.s.i. hydrogen; and liquid hourly space velocity (LHSV), 0.1 to 5 hour$^{-1}$. Preferably, conditions of 475° to 650° F., 700 to 1000 p.s.i. hydrogen, and LHSV of 0.5 to 1 hour$^{-1}$ are employed. Although a liquid recycle is not a necessity, generally a liquid recycle ratio of 1 to 10 parts recycle to one part feed is employed. It should be noted that conditions of severe temperature above 700° F. will tend to create a detrimental cracking effect. Any of the catalysts conventionally employed in the hydrogenation of petroleum oils can be utilized in accordance with the hydrogenation process. Examples of suitable catalytic ingredients heretofore employed are molybdenum, tungsten, vanadium, chromium, nickel, cobalt, and mixtures thereof, and their oxides or sulfides. Usually the catalyst metals, oxides, or sulfides are supported on a carrier such as alumina, silica-alumina, or magnesia, or the like. The preferred catalyst, however, is a nickel-molybdenum on an alumina support, presulfided with 10% hydrogen sulfide in hydrogen.

The solvent treatment, the second step in the process, is one that can be considered "cold" in relation to solvent treatments generally employed in the petroleum industry. The solvent treatment takes place at approximately 60° to 120° F., while employing a solvent dosage in the range of 50 to 300%. Generally, one to nine theoretical extraction stages can be utilized in gaining the desired product; however, best results are obtained while using two to seven theoretical stages. Treatment at this temperature and solvent dosage enables the extraction to be one of high selectivity, such that the extract contains about 65 to 90% aromatics. The selectivity created by the cold solvent treatment also enables us to adequately treat a distillate lube stock extract as well as the crude residuum extract in producing our improved product. The preferred conditions for carrying out the solvent treatment are a temperature of approximately 70° to 80° F. and a solvent dosage of 90 to 110%, with the treatment carried out in five stages. Any solvent, such as furfural, phenol, etc., which can selectively remove aromatics can be advantageously employed.

The charge stock is derived from any crude which contains lubricating oil components, such as crudes derived from Pennsylvania, Louisiana, Texas, California, Venezuela or Kuwait, and preferably West Texas or Louisiana. The charge stock preferably contains a plurality of lubricating oil viscosity grades or is a wide range lubricating oil stock.

With reference to the drawing, a reduced crude obtained through the fractionation of crude oil in line 10 is distilled in a vacuum distillation zone 11 which separates a fresh gas oil in overheads line 12, a distillate stock in line 13, and a crude residuum stock in line 14.

The distillate stock in line 13 is then passed to a solvent-treating unit 15. Here the lube stock undergoes an extraction process which removes low V.I. components as well as unstable aromatics and sulfur compounds and produces a raffinate in line 16 and an extract in line 17. Various solvents which selectively remove aromatics, such as furfural, phenol, sulfur dioxide, and the like, can be employed in treating the lube stock, with furfural the preferred solvent. The temperature, of course, will vary with the particular solvent employed in a given case; however, the temperature is selected so that the extraction stage is entirely in a liquid phase. In the case of furfural, temperatures in the range of 170° to about 240° F. are generally employed. Solvent dosage, although not critical, is usually controlled above 170% to maintain lube quality.

The crude residuum stock in line 14 is also passed to a solvent-treating zone 18 which removes asphalts and aromatics from the residuum charge in the extract, line 20, and a paraffin-rich stream in the raffinate, line 19. Although various solvents, as heretofore mentioned, can be utilized for this solvent treatment, the preferred extraction is carried out by the Duo-Sol process, i.e., a process which employs two solvents, propane and "Selecto," a mixture of phenol and cresol. The Duo-Sol process is preferable since it simultaneously solvent-treats and deasphalts the crude stock. If not employed, the crude stock is first deasphalted using propane or any other deasphalting solvent, and the product is then solvent-treated using selective solvents such as furfural, phenol, etc. A similar product will be obtained through either method. The temperature is approximately 120° to 180° F., and solvent dosage is kept at a minimum of 200 to 600% Selecto and 400 to 1000% propane.

The extracts in lines 17 and 20 are then stripped from their solvents in strippers 30 and 31, respectively, and the aromatic products of each are then combined in line 21 and redistilled in distillation zone 22 to give the high aromatic base stock 23 used for process oils. The bottoms, line 24, are used for asphalt or heavy fuel oil.

The high aromatic base stock 23 is then passed into a mild hydrogenation unit 25 and then via line 26 to the solvent-treating unit 27. The hydrogenation unit employs the conditions and catalyst aforedescribed; and, as aforementioned, the extraction takes place at approximately 60° to 120° F., which improves the selectivity for aromatics of the solvents. Any of the solvents well known in the art for high selectivity may be employed in this stage of the process. Furfural is the preferred solvent, although phenol and acetophenone, among others, have also shown high selectivity. The final product leaves the solvent-treating unit 27 through line 28 and the bottoms through line 29.

The apparatus which is employed in this process can be any suitable equipment well known in the art. Illustrative, but nonlimiting, examples of solvent-treating equipment are rotating disc contractors, Podbielniak centrifugal reactors, countercurrent extraction columns, and the like. The catalyst for the hydrogenation process may be maintained as one or more fluidized beds, gravitating beds, or fixed beds of small particles through which the oil and hydrogen are passed, upflow or downflow, cocurrent or countercurrent.

Example I

A charge stock of solvent lube crude mix was charged to a distillation tower and fractionated into approximately 70% overheads and 30% bottoms. The bottoms or reduced crude had an initial boiling point of 650° F. at atmospheric pressure. The reduced crude was then charged to a second distillation zone and fractionated to produce a gas oil, a distillate stock, and a crude residuum asphalt stock; the latter two had initial boiling points of about 700° and 850° F. respectively. The distillate stock was then passed to a solvent-treating tower where it was extracted with furfural at about 190° F. The solvent dosage was maintained at approximately 170%.

The crude residuum was transferred to a Duo-Sol extraction unit where it was contacted at about 130° F. with two solvents, propane and Selectro (25 to 30% cresol, 70 to 75% phenol). The solvent dosage was controlled at a minimum of 300% Selecto and 500% propane. The extracts from the Duo-Sol extraction and the furfural extraction were stripped of their solvents and then combined and treated in a distillation tower to remove any asphalt retained. A sidestream, i.e., one of the general process oil base stocks, was analyzed, and the results are found in Table I. Results are also given for a typical commercial product comprising a high aromatic petroleum extender for rubber.

TABLE I

| | Base stock | Commercial product |
|---|---|---|
| API gravity | 12.0–13.5 | 13.7 |
| Viscosity, SUS/100° F | 3429.9 | 4,000 |
| Viscosity, SUS/200° F | 91.979 | 90 |
| Percent aromatics | 79.7 | 66.5 |
| Color, ASTM D-1500 | [1] (8.0+) | 4.0 |
| Aged color | [1] (8.0+) | 5.0–6.0 |

[1] Immeasurable

The base stock was then hydrogenated at a temperature of 650° F. with a hydrogen pressure of 800 p.s.i. in the presence of an presulfided nickel-molybdenum on alumina support catalyst in a trickle-bed reactor. A liquid recycle stream, in the ratio of 7 parts recycle to 1 part feed, with a fresh feed liquid hourly space velocity of 0.75 per hour was used.

The hydrogenated product was then furfural-extracted crosscurrently in two stages at 70° F. and a solvent dosage of 100% in a batch extraction apparatus. The product yield was approximately 85 to 90%. The results are shown in Table II.

TABLE II

| | Unextracted | Extracted |
|---|---|---|
| Percent aromatics | 72.0 | 66.6 |
| Initial D-1500 color | 4.25 | 3.25 |
| Aged color | 7.50 | 4.25 |

The color of the oils was determined by ASTM D-1500 using the ASTM Union Colorimeter. In this test method, a sample of oil is compared with a series of standard color discs until the nearest match is obtained. Colors are reported as numbers from 1 to 8, the highest numbers denoting the darker colors.

The test procedure for determining the UV stability was as follows: A 30 ml. sample of the oil was placed in an open 100 ml. beaker. Two 275 watt UV sunlamps were placed approximately 12 inches away from the surface of the sample. The sample was placed in an air-ventilated oven on a rotating table and heated to 120° F. The UV light was turned on when the sample was placed in the oven. After 48 hours, color of the test samples was determined using the ASTM D-1500 test.

Example II

The procedure and conditions as described in Example I were employed; however, hydrogenation took place at 475° F. and 1000 p.s.i. hydrogen. The hydrogenated base stock had a D-1500 color of 2.5, while the extracted hydrogenated base stock had a D-1500 color of 2.0. The hydrogenation occured in a pressure-bomb reactor.

It is to be understood that the above description is for the purpose of illustration and not by way of limitation and that changes and modifications may be made therein without departing from the spirit and scope of the invention.

We claim:
1. A method for producing high aromatic oils which are stable to ultravoilet light and have low color characteristics which comprises subjecting a highly aromatic extract stream of a reduced crude oil feed to a mild hydrogenation process in the presence of a hydrogenation catalyst at a temperature in the range of 400° to 675° F., a hydrogen pressure of 200 to 1500 p.s.i., and a liquid hourly space velocity of 0.1 to 5.0 per hour, and thereafter selectively solvent-treating the hydrogenated base stock at a temperature in the range of 60° to 120° F. and a solvent dosage of 50 to 300% with selective solvent for aromatics.

2. A method as described in claim 1 wherein a recycle ratio of 1 to 10 parts liquid recycle per 1 part feed is employed during hydrogenation.

3. A method as described in claim 2 wherein the temperature during hydrogenation is 475° to 650° F. and the hydrogen pressure is 700 to 1000 p.s.i.

4. A method as described in claim 1 wherein the solvent treatment temperature is 70° to 80° F.

5. A method as described in claim 4 wherein the solvent dosage is 90 to 110%.

6. A method as described in claim 3 wherein the solvent treatment temperature is 70° to 80° F. and the solvent dosage is 90 to 110%.

7. A method for producing high aromatic oils which are stable to ultraviolet light and have low color characteristics which comprises:
   (a) distilling a reduced crude obtained through the fractionation of crude oil to produce a distillate stock and a crude residuum asphalt stock,
   (b) solvent-treating the distillate stock and the crude residuum asphalt with a selective solvent for aromatics,
   (c) stripping the solvents from the high aromatic extracts obtained in the solvent-treating step,
   (d) combining said extracts,
   (e) distilling the combined extracts to form a high aromatic base stock,
   (f) subjecting the high aromatic base stock to a mild hydrogenation process in the presence of a hydrogenation catalyst at a temperature in the range of 400° to 675° F., a hydrogen pressure of 200 to 1500 p.s.i., and a liquid hourly space velocity of 0.1 to 5.0 per hour, and
   (g) selectively solvent-treating the hydrogenated base stock at a temperature in the range of 60° to 120° F. and a solvent dosage of 50 to 300% with a selective solvent for aromatics.

8. A method as described in claim 7 wherein a recycle ratio of 1 to 10 parts liquid recycle per 1 part feed is employed during hydrogenation.

9. A method as described in claim 8 wherein the temperature during hydrogenation is 475° to 650° F. and the hydrogen pressure is 700 to 1000 p.s.i.

10. A method as described in claim 7 wherein the hydrogenated base stock solvent treatment temperatures is 70° to 80° F.

11. A method as described in claim 10 wherein the solvent dosage during the solvent treatment of the hydrogenated base stock is 90 to 110%.

12. A method as described in claim 9 wherein the hydrogenated base stock solvent treatment temperature is 70° to 80° F. and the solvent dosage is 90 to 110%.

13. The product obtained by the process of claim 1.

14. The product obtained by the process of claim 7.

References Cited

UNITED STATES PATENTS

| | | | |
|---|---|---|---|
| 2,865,839 | 12/1958 | Halter et al. | 208—96 |
| 3,108,935 | 10/1963 | Penning et al. | 208—14 |
| 3,414,506 | 12/1968 | Campagne | 208—309 |

HERBERT LEVINE, Primary Examiner

U.S. Cl. X.R.

208—14, 87; 260—33.6